(No Model.)
J. T. FOSTER.
CHOPPING KNIFE.
No. 288,044. Patented Nov. 6, 1883.
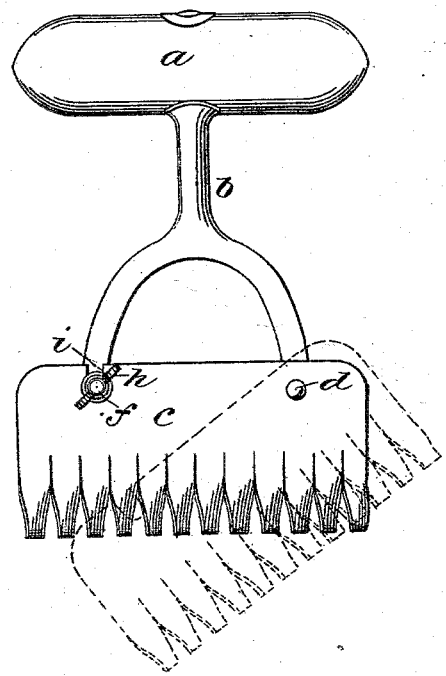
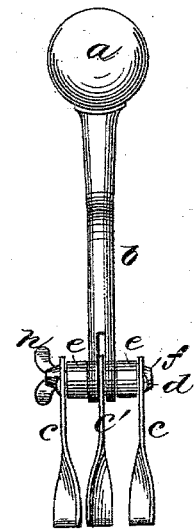
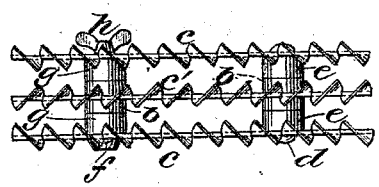
Witnesses:
Henry F. Parker.
Geo. E. Cravin
Inventor:
John T. Foster
by Chas. M. Higgins
Attorney

UNITED STATES PATENT OFFICE.

JOHN T. FOSTER, OF ARLINGTON, NEW JERSEY, ASSIGNOR TO HORACE F. SISE, OF NEW YORK, N. Y.

CHOPPING-KNIFE.

SPECIFICATION forming part of Letters Patent No. 288,044, dated November 6, 1883.

Application filed May 28, 1883. (No model.)

*To all whom it may concern:*

Be it known that I, JOHN T. FOSTER, of Arlington, Hudson county, New Jersey, have invented certain new and useful Improvements in Chopping-Knives, of which the following is a specification.

My invention aims to provide a simple, cheap, and effective chopping or mincing knife, more particularly designed for tendering steaks, but which shall also serve to rapidly and minutely hash or mince meats, vegetables, and other substances. To these ends I construct the blade of my improved knife of a sheet of steel or other suitable metal, having its chopping-edge slit into a series of comb-like teeth or chisels, which are turned diagonally or at an angle to the plane of the blade, thereby obtaining a minutely-dividing edge on the chopping-blade. I also prefer to construct the knife with a series of two or more of such blades, set parallel with each other on the handle, and with their teeth turned at opposite or at similar inclinations, whereby a rapid and multiple mincing effect will be obtained when the knife is used. I also prefer to pivot the blades at one corner to the handle, and provide a detachable clamp or fastening at the other corner, whereby the plates may be loosened at the clamped corner, and swung out, as on a pivot, from the other corner, so that the blades may thus be easily separated or diverged for more effectual cleaning or sharpening.

My invention lies chiefly in the several features above outlined, as hereinafter fully set forth.

In the drawings annexed, Figure 1 presents a front elevation of my improved knife; Fig. 2, an end elevation thereof, and Fig. 3 an inverted plan of the blades.

In Figs. 1 and 2, $a$ indicates the handle of the knife, which is preferably made of wood in an ordinary cylindrical form, with rounded ends, and disposed in horizontal position, adapted to be readily grasped and encircled by the fingers, and to fit in the palm of the hand. From the middle of this handle an inverted Y-shaped stem, $b$, depends, the top of its central branch being riveted firmly in the handle, while its two lower or forked branches are firmly connected with the chopping-blades $c\ c'\ c$, three of which are preferably used in parallel position, as shown in Figs. 2 and 3.

The stem $b$ is preferably made of malleable iron, and the lower end of its forked branches are slit, as seen in Fig. 2, to receive the middle blade, $c'$, and through a perforation in the same is passed a rivet, $d$, which also passes through a similar perforation in a corresponding position in the corners of the outer blades, $c\ c$, the ends of this rivet being spread or headed over the outer blades, $c\ c$, thus holding the series securely on the handle. The blades do not fit tightly upon the rivet, but can be easily turned thereon as upon a pivot, as indicated in dotted lines in Fig. 1, and washers $e\ e$ are slipped upon the rivet between the outer blades and the branch of the stem $b$, to keep the blades separated in the desired parallel positions, as will be understood. At the opposite corner of the blades a clamp screw or bolt, $f$, passes through the opposite branch of the stem $b$ and through slots $i$ in the respective plates, washers $g\ g$ being also interposed between the respective plates, so that when the plates are swung up on the bolt with the two outer plates, respectively, under the head and clamp-nut of the bolt, by turning up the clamp-nut $h$, the blades will be held firmly in position for use, as shown by full lines in Figs. 1, 2, and 3.

Each blade is preferably made of a thin plate of sheet-steel, of rectangular or other shape, its lower edge being beveled or ground to a cutting-edge, and then slit transversely into a series of comb-like teeth or chisels, which are turned or twisted slightly, so that their cutting-edges lie diagonally or at any desired angle to the plane of the blade, as fully shown in the several figures. The cutting-edge of the plate thus presents a series of individual teeth or lances, which will penetrate a steak at numerous points when reciprocated thereon, and thus produce an effectual tendering action thereon previous to the cooking of the steak.

When used for hashing or mincing meat, the comb-like incising-edge of the blade will obviously produce a rapidly and minutely dividing effect, and act with greater advantage than would a plane continuous edge or a continuous corrugated edge, as heretofore used.

It is further obvious that where a series of two or more of these blades are used, as illustrated in Figs. 2 and 3, that the rapidly-mincing and minutely-dividing action of the knife will be multiplied, and thus rendered much more effective.

Where the teeth of the respective blades are turned at opposite inclinations, as shown in Figs. 2 and 3, it is evident that in succeeding strokes the cut of one set will strike across the cut of the other, and thus produce a better mincing effect than would be the case if all the teeth were at similar inclinations, in which case the succeeding cuts of one set would be more likely to fall into the previous cuts of the other set. I therefore prefer to have the teeth of the middle plate set at an inclination opposite to the teeth of the outer blades, as best shown in Fig. 3, which presents the obvious advantage above set forth.

When it is desired to sharpen or clean the knives, if the interior portions of the blades are not sufficiently accessible, the clamp-nut $h$ may be loosened and the blades swung out and diverged from each other on the pivot $d$, as indicated by dotted lines in Fig. 1, which will render all sides of the blades readily accessible for the aforesaid purposes, after which they can be again easily fastened in position for use.

Having thus detailed the construction and advantages of my invention, I would remark that I do not confine myself to any special number of blades, nor to any particular angle or relative inclination of the teeth, nor to the mode of connecting them with the handle $a$, although I claim some of such arrangements as special features of my invention.

What I claim is—

1. A chopping or mincing knife having a blade formed of a sheet of metal, with its cutting-edge slit into a series of comb-like teeth twisted at an inclination to the plane of the blade, substantially as and for the purpose set forth.

2. A chopping-knife formed with a series of blades set parallel with each other, and having their cutting-edges slit into a series of comb-like teeth turned at an angle to the plane of the blades, substantially as herein set forth.

3. A chopping-knife formed with a series of blades set parallel with each other, and having their cutting-edges slit into a series of teeth turned at an inclination to the plane of the blades, and set at opposite inclinations in respective blades, substantially as and for the purpose set forth.

4. A chopping-knife formed with a series of parallel blades pivoted to the handle, and capable of being swung out or diverged thereon when required, and provided with a detachable clamping device to hold the blades firmly to the handle when in use, substantially as herein set forth.

5. In a chopping-knife, the combination, with the supporting-handle, of the parallel blades $c\ c$, slotted at $i$, with pivotal fastening-rivet $d$ and clamp device $f\ h$, substantially as and for the purpose set forth.

JOHN T. FOSTER.

Witnesses:
   CHAS. M. HIGGINS,
   CHARLES L. BELLAMY.